(12) United States Patent
Yokoyama et al.

(10) Patent No.: US 11,648,624 B2
(45) Date of Patent: May 16, 2023

(54) LASER PROCESSING APPARATUS AND OPTICAL ADJUSTMENT METHOD

(71) Applicant: Panasonic Intellectual Property Management Co., Ltd., Osaka (JP)

(72) Inventors: Jun Yokoyama, Osaka (JP); Yohei Takechi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 36 days.

(21) Appl. No.: 16/941,446

(22) Filed: Jul. 28, 2020

(65) Prior Publication Data

US 2021/0060695 A1 Mar. 4, 2021

(30) Foreign Application Priority Data

Aug. 29, 2019 (JP) .............................. JP2019-156755

(51) Int. Cl.
*B23K 26/042* (2014.01)
*B23K 26/03* (2006.01)
(Continued)

(52) U.S. Cl.
CPC .......... *B23K 26/042* (2015.10); *B23K 26/032* (2013.01); *B23K 26/0608* (2013.01);
(Continued)

(58) Field of Classification Search
CPC ............... B23K 26/042; B23K 26/032; B23K 26/0608; B23K 26/0643; B23K 26/0648;
(Continued)

(56) References Cited

U.S. PATENT DOCUMENTS 6,881,925 B1 * 4/2005 Sato ..................... B23K 26/356
219/121.73
2009/0184234 A1 7/2009 Shindo et al.
(Continued)

FOREIGN PATENT DOCUMENTS

JP H01309323 A * 12/1989
JP H04-283603 A 10/1992
(Continued)

OTHER PUBLICATIONS

Scientific America, What is an optical interferometer, p. 1 (Year: 1999).*
(Continued)

*Primary Examiner* — John J Norton
*Assistant Examiner* — Franklin Jefferson Wang
(74) *Attorney, Agent, or Firm* — McDermott Will & Emery LLP

(57) ABSTRACT

A laser processing apparatus emits processing light, measurement light, processing guide light, and measurement guide light with which a surface of a workpiece is irradiated. Respective wavelengths of the processing guide light and the measurement guide light are set to wavelengths at which a deviation amount between an irradiation position of the processing guide light and an irradiation position of the measurement guide light due to a chromatic aberration of magnification of a lens, and a deviation amount between an irradiation position of the processing light and an irradiation position of the measurement light due to the chromatic aberration of magnification of the lens are equal to each other. Therefore, positioning of spot positions of a plurality of laser lights having different output differences can be realized with high accuracy and high speed.

9 Claims, 12 Drawing Sheets

(51) Int. Cl.
*B23K 26/06* (2014.01)
*G01B 11/22* (2006.01)
*G01B 11/00* (2006.01)
*G01B 11/27* (2006.01)
*G01B 9/02* (2022.01)
*G02B 27/14* (2006.01)
*G02B 27/10* (2006.01)
*G02B 19/00* (2006.01)

(52) U.S. Cl.
CPC ...... *B23K 26/0643* (2013.01); *B23K 26/0648* (2013.01); *B23K 26/0665* (2013.01); *G01B 9/02* (2013.01); *G01B 11/002* (2013.01); *G01B 11/22* (2013.01); *G01B 11/272* (2013.01); *G02B 19/0009* (2013.01); *G02B 19/0047* (2013.01); *G02B 27/1006* (2013.01); *G02B 27/141* (2013.01)

(58) Field of Classification Search
CPC .... B23K 26/0665; G01B 9/02; G01B 11/002; G01B 11/22; G01B 11/272; G02B 19/0009; G02B 19/0047; G02B 27/1006; G02B 27/141
See application file for complete search history.

(56) References Cited

U.S. PATENT DOCUMENTS

| | | | |
|---|---|---|---|
| 2016/0202045 | A1 | 7/2016 | Schonleber et al. |
| 2019/0151988 | A1* | 5/2019 | Murakami ......... B23K 26/0648 |
| 2020/0246911 | A1* | 8/2020 | Webster ................ B23K 10/02 |
| 2020/0376591 | A1* | 12/2020 | Sakai ................... B23K 26/064 |
| 2021/0031298 | A1* | 2/2021 | Sakai ....................... G01B 9/02 |
| 2022/0016730 | A1* | 1/2022 | Stambke ................ G01B 11/24 |

FOREIGN PATENT DOCUMENTS

| | | | |
|---|---|---|---|
| JP | H08264414 | A * | 10/1996 |
| JP | 2005115072 | A * | 4/2005 |
| JP | 2008-093682 | A | 4/2008 |
| JP | 2013-10116 | A | 1/2013 |
| JP | 2016-538134 | A | 12/2016 |
| WO | 2019/159659 | A1 | 8/2019 |

OTHER PUBLICATIONS

Walker, Lateral Color, 2008, SPIE, Excerpt from Optical Engineering Fundamentals Second Edition, https://spie.org/publications/tt82_69_lateral_color?SSO=1 (Year: 2008).*
Walker, Lateral Color, 2008, SPIE, Excerpt from Optical Engineering Fundamentals Second Edition (Year: 2008).*
Roddier, What is an optical interferometer, 1999, Scientific American, (Year: 1999).*

* cited by examiner

FIG. 12

| INCIDENT ANGLE OF PROCESSING LIGHT ON LENS (deg) | 0.5 | 1.0 | 1.5 | 2.0 |
|---|---|---|---|---|
| DEVIATION AMOUNT x BETWEEN IRRADIATION POSITIONS OF GUIDE LIGHTS (mm) | -1.310 | -1.311 | -1.313 | -1.314 |
| DEVIATION AMOUNT x BETWEEN IRRADIATION POSITIONS OF PROCESSING LIGHT AND MEASUREMENT LIGHT (mm) | 0.002 | 0.005 | 0.002 | 0 |

LASER PROCESSING APPARATUS AND OPTICAL ADJUSTMENT METHOD

CROSS-REFERENCE OF RELATED APPLICATIONS

This application claims the benefit of Japanese Patent Application No. 2019-156755, filed on Aug. 29, 2019, the entire disclosure of which Application is incorporated by reference herein.

BACKGROUND

1. Technical Field

The present disclosure relates to a laser processing apparatus used for processing, drilling, welding, cutting, or the like, and an optical adjustment method for adjusting spot positions of a plurality of lights emitted from the laser processing apparatus.

2. Description of the Related Art

In the related art, a laser light positioning technique performed using a slit is disclosed in, for example, Japanese Patent Unexamined Publication No. 2008-93682 (hereinafter referred to as "Patent Document 1").

Hereinafter, the laser light positioning technique disclosed in Patent Document 1 will be described with reference to FIGS. 13 and 14.

FIG. 13 is a perspective view illustrating an external appearance of a laser light positioning device disclosed in Patent Document 1. FIG. 14 is a side sectional view of the positioning device illustrated in FIG. 13. FIG. 14 illustrates a positional relationship between laser light 108 emitted from laser head 107, adjustment wafer 100 provided with slit 102, and laser power meter 101.

As illustrated in FIG. 13, in the laser light positioning device of Patent Document 1, slit 102 provided on adjustment wafer 100 is moved in a direction of a double arrow illustrated in FIG. 13 by the rotation of support shaft 103.

As illustrated in FIG. 14, in the laser light positioning device of Patent Document 1, laser light 108 is emitted from laser head 107. Laser light 108 reaches laser power meter 101 along optical axis 109 unless there is an obstacle.

The positioning device of Patent Document 1 includes support shaft 103, Z-direction driver 104, R-direction driver 105, adjustment wafer 100, laser head base 106, laser head 107, laser power meter 101, and the like. Respective positions of adjustment wafer 100 and laser head 107 are relatively moved by support shaft 103, Z-direction driver 104, and R-direction driver 105. An output of laser power meter 101 due to the relative movement is observed. In this case, a focus position of laser light 108 is aligned with a position of slit 102. Thereby, a position of laser light 108 can be adjusted to a desired position.

In the related art, it is also realized that a beam profiler using a two-dimensional light receiving element is used to directly detect laser light spot position coordinates in a plane and adjusts the position of the laser light. As the two-dimensional light receiving element, for example, a complementary metal oxide semiconductor (CMOS) element which is an image pickup element, or the like is exemplified.

In recent years, an evaluation method for observing a welding step in real time by combining a laser welding device and an optical coherence tomography (OCT) has been disclosed, for example, in Published Japanese Translation No. 2016-538134 of the PCT International Publication (hereinafter referred to as "Patent Document 2"). However, in order to realize the evaluation method of Patent Document 2, precise positioning of the processing laser light and the measurement light is very important. Therefore, in recent years, adjustment of the spot position of the laser light has become an indispensable technique.

However, in the laser light positioning device of Patent Document 1, in a case where a spot diameter at the focal position of laser light 108 is extremely small, it is necessary to narrow a slit width of slit 102 according to the spot diameter. If the slit width is narrow, it is difficult to quickly capture the spot position of laser light 108 in slit 102 in an initial stage of adjustment. That is, in the positioning device of Patent Document 1, it is difficult to realize positioning with high accuracy and high speed.

SUMMARY

The present disclosure provides a laser processing apparatus and an optical adjustment method capable of realizing positioning of spot positions of a plurality of laser lights having different output differences with high accuracy and high speed.

A laser processing apparatus according to an aspect of the present disclosure includes: a laser oscillator that emits processing light with which a processing point of a surface of a workpiece is irradiated; and a measurement unit that emits measurement light with which the processing point is irradiated, and detects the measurement light reflected at the processing point. The laser processing apparatus further includes a mirror that combines the processing light and the measurement light; a lens that condenses the processing light and the measurement light on the processing point; and a measurement processor that performs a predetermined measurement based on a signal from the measurement unit. The laser oscillator and the measurement unit emit processing guide light and measurement guide light respectively with which a surface of the workpiece is irradiated for adjusting a deviation between an irradiation position of the processing light and an irradiation position of the measurement light on the surface of the workpiece. Respective wavelengths of the processing guide light and the measurement guide light are set to wavelengths at which a deviation amount between an irradiation position of the processing guide light and an irradiation position of the measurement guide light due to a chromatic aberration of magnification of the lens, and a deviation amount between the irradiation position of the processing light and the irradiation position of the measurement light due to the chromatic aberration of magnification of the lens are equal to each other.

One aspect of the present disclosure is an optical adjustment method performed by a laser processing apparatus that emits processing light, measurement light, processing guide light, and measurement guide light with which a surface of a workpiece is irradiated. In the optical adjustment method, in a first optical adjustment, aligning an irradiation position of the processing light with an irradiation position of the measurement light without using the processing guide light and the measurement guide light, and recording a deviation amount between an irradiation position of the processing guide light and an irradiation position of the measurement guide light, as a deviation amount of an initial adjustment position. In the optical adjustment method, in second and subsequent optical adjustments, adjusting a deviation amount between an irradiation position of the processing guide light and an irradiation position of the measurement guide light so as to be equal to the deviation amount of the initial adjustment position.

According to the present disclosure, it is possible to provide a laser processing apparatus and an optical adjustment method capable of realizing positioning of spot positions of a plurality of laser lights having different output differences with high accuracy and high speed.

BRIEF DESCRIPTION OF THE DRAWINGS

FIG. 12 is a table illustrating an optical simulation result of optical adjustment of the processing light and the measurement light by the guide light according to the exemplary embodiment of the present disclosure;

DETAILED DESCRIPTION

Figure 1:
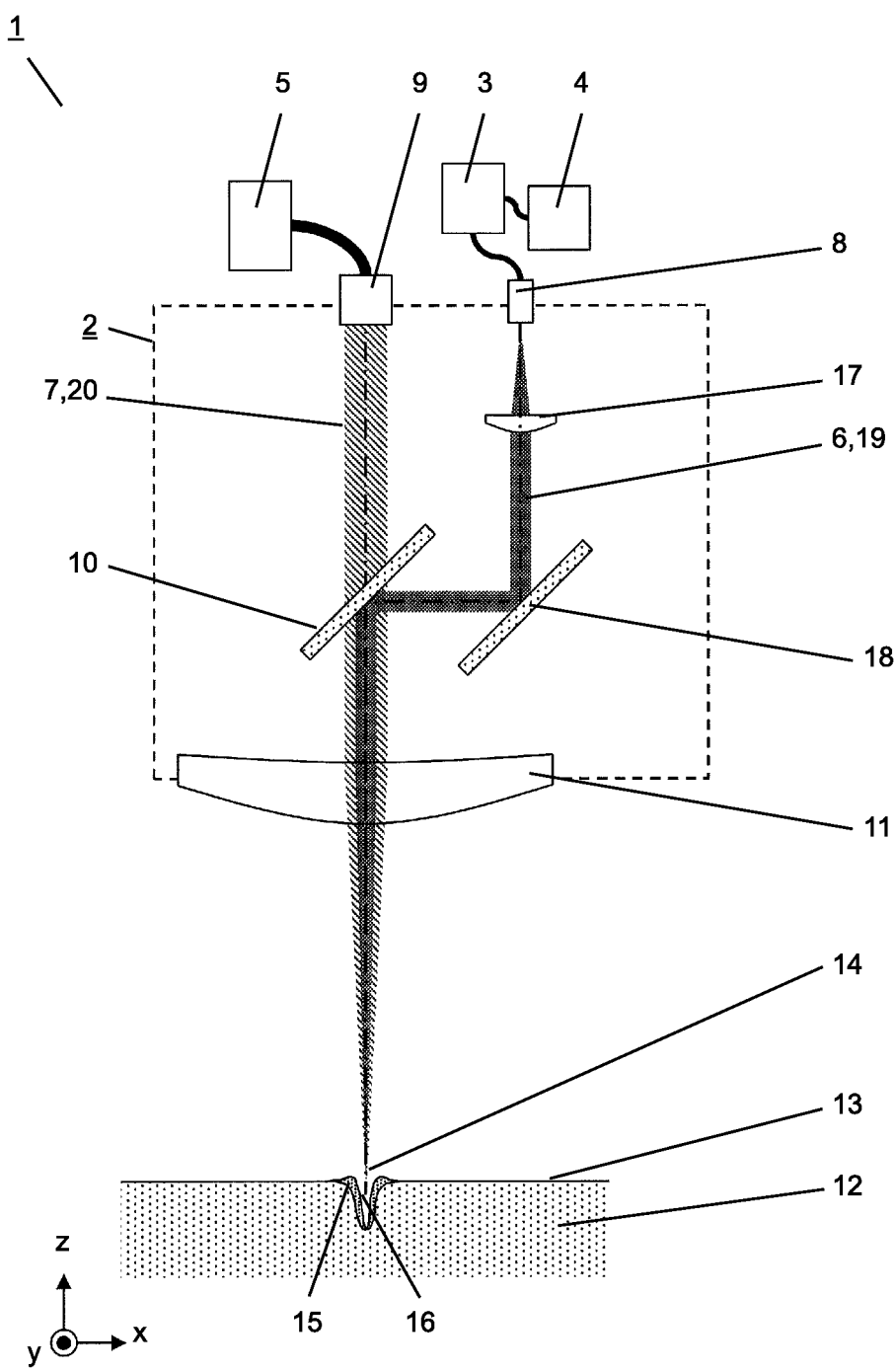
FIG. 1 is a view schematically illustrating a configuration of a laser processing apparatus according to an exemplary embodiment of the present disclosure.

Hereinafter, exemplary embodiments of the present disclosure will be described with reference to the drawings. The same reference numerals are given to common constituent elements in each drawing, and the description thereof will be appropriately omitted.

Exemplary Embodiments

Hereinafter, the laser processing apparatus and the optical adjustment method according to exemplary embodiments of the present disclosure will be described by dividing them into items.

<Configuration of Laser Processing Apparatus>

First, a configuration of laser processing apparatus 1 according to the exemplary embodiment of the present disclosure will be described with reference to FIG. 1.

FIG. 1 is a view schematically illustrating the configuration of laser processing apparatus 1 according to the present exemplary embodiment.

As illustrated in FIG. 1, laser processing apparatus 1 according to the present exemplary embodiment includes processing head 2, measurement unit 3, measurement processor 4, laser oscillator 5, and the like.

Measurement unit 3 is, for example, an optical interferometer for OCT measurement. Measurement unit 3 emits measurement light 6 which is laser light for the OCT measurement. Emitted measurement light 6 is input from measurement light inlet 8 to processing head 2.

Laser oscillator 5 oscillates processing light 7 which is laser light for laser processing. Oscillated processing light 7 is input from processing light inlet 9 to processing head 2.

Processing light 7 input to processing head 2 passes through first mirror 10 (may be simply referred to as "mirror") and lens 11, and is condensed on processing surface 13 on a surface of workpiece 12. Therefore, processing point 14 on processing surface 13 of workpiece 12 is laser-processed. In this case, workpiece 12 at processing point 14 irradiated with processing light 7 is melted and molten pool 15 is formed. A molten metal is evaporated from formed molten pool 15. Therefore, keyhole 16 is formed in workpiece 12 by a pressure of vapor generated during evaporation.

On the other hand, measurement light 6 input to processing head 2 is converted into parallel light by collimating lens 17 and reflected by second mirror 18 and first mirror 10 (mirror). Second mirror 18 and first mirror 10 (mirror) constitute an adjustment mechanism that adjusts the irradiation positions of processing light 7 and measurement light 6 described later.

After that, reflected measurement light 6 passes through lens 11 and is condensed on processing point 14 on the surface of workpiece 12. Condensed measurement light 6 is reflected by a bottom surface of keyhole 16 and traces the propagation path to reach measurement unit 3. Measurement unit 3 generates an optical interference intensity signal based on interference generated by an optical path difference between the measurement light reflected by keyhole 16 and reference light.

Measurement processor 4 measures a depth of keyhole 16, that is, a penetration depth of processing point 14 based on the optical interference intensity signal generated by measurement unit 3. The "penetration depth" means a distance between a highest point of a melted portion of workpiece 12 and processing surface 13.

In general, a wavelength of processing light 7 and a wavelength of measurement light 6 are different. Specifically, in a case where a YAG laser or a fiber laser is used as processing light 7, the wavelength of processing light 7 is 1064 nm. On the other hand, in a case where an OCT light source is used as measurement light 6, the wavelength of measurement light 6 is 1300 nm.

First mirror 10 (mirror) is, for example, a dichroic mirror. Therefore, first mirror 10 has characteristics of transmitting the light of the wavelength of processing light 7 and reflecting the light of the wavelength of measurement light 6.

Usually, in laser processing apparatus 1, high-power laser light is used as processing light 7. Therefore, a temperature change occurs in a body of processing head 2, a fixed portion of an optical component configuring processing head 2, or the like due to absorption of reflected light from processing surface 13 of workpiece 12, reflected light in the optical component configuring processing head 2, absorption of heat, or the like.

The temperature change changes a fixed state (for example, a position where the optical component is fixed) of the optical component configuring processing head 2. Therefore, an incident angle of each of processing light 7 and measurement light 6 on lens 11 changes. As a result, a deviation occurs in arrival positions (also referred to as spot positions, hereinafter, referred to as "irradiation positions") of processing light 7 and measurement light 6 on processing surface 13 of workpiece 12. Therefore, second mirror 18 of the present exemplary embodiment is provided with an adjustment mechanism capable of changing the angle of measurement light 6 in two or more axes. Thus, it is possible to adjust the deviation between the irradiation positions of processing light 7 and measurement light 6.

Specifically, the deviation of the irradiation position is adjusted by using measurement guide light 19 and processing guide light 20. Measurement guide light 19 is emitted from measurement unit 3 and input from measurement light guide inlet 8 to processing head 2. Processing guide light 20 is emitted from laser oscillator 5 and input from processing light inlet 9 to processing head 2.

In the following description, measurement guide light 19 and processing guide light 20 may be collectively referred to as "guide light".

<Problem of Optical Adjustment with Guide Light>

Next, a problem in a case of adjusting the irradiation position of processing light 7 and the irradiation position of measurement light 6 by using the guide light will be described with reference to FIG. 2.

In general, red guide light is often used as the guide light for reasons such as visibility. As an example, a case where both processing guide light 20 and measurement guide light 19 are red laser light having a wavelength of 635 nm will be described.

As described above, the wavelength of processing light 7 and the wavelength of measurement light 6 are different from each other. Therefore, when processing light 7 and measurement light 6 pass through lens 11, a chromatic aberration occurs in processing light 7 and measurement light 6.

The chromatic aberration is an aberration that occurs because a general optical material including lens 11 has a property that a refractive index varies depending on the wavelength of light.

There are two types of the chromatic aberration of an axial chromatic aberration and a chromatic aberration of magnification. The axial chromatic aberration is an aberration due to a property that the focal position of the lens varies depending on the wavelength of light. On the other hand, the chromatic aberration of magnification is an aberration due to a property that an image height on a focal plane varies depending on the wavelength of light.

Figure 2:
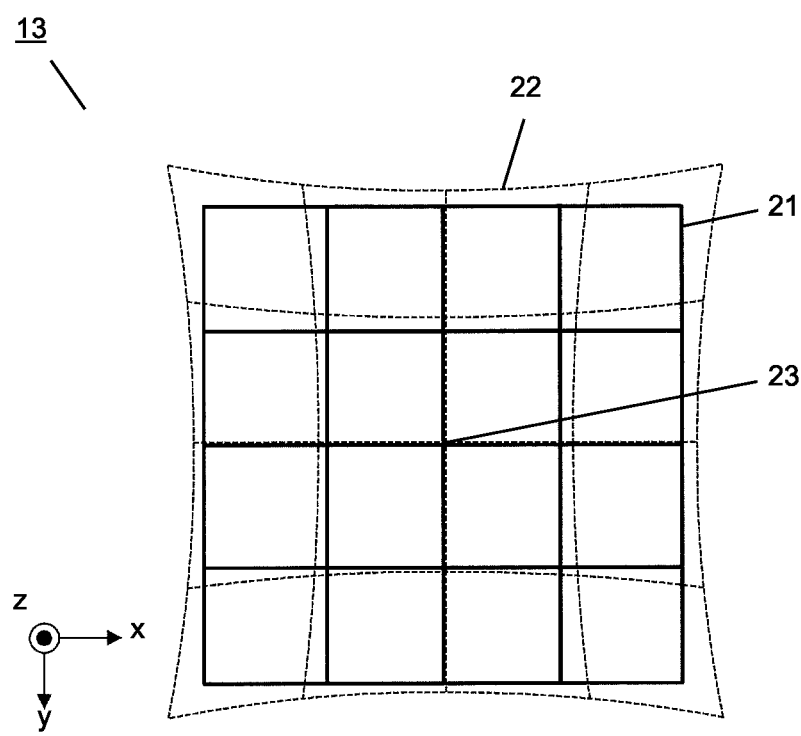
FIG. 2 is a view illustrating an example of a chromatic aberration of magnification of a lens for processing light and measurement light.

FIG. 2 is a view illustrating an example of the chromatic aberration of magnification of processing light 7 and measurement light 6 by lens 11. In FIG. 2, processing light irradiation position 21 that is the irradiation position of processing light 7 is illustrated by a solid line, and measurement light irradiation position 22 that is the irradiation position of measurement light 6 is illustrated by a broken line.

As illustrated in FIG. 2, in the vicinity of lens center 23, processing light irradiation position 21 and measurement light irradiation position 22 on processing surface 13 match with each other. However, as a distance from lens center 23 increases, the deviation between processing light irradiation position 21 and measurement light irradiation position 22 on processing surface 13 increases. That is, as illustrated in FIG. 2, in a case where processing light irradiation position 21 has a lattice-shaped pattern without distortion, measurement light irradiation position 22 has a distorted bobbin-shaped pattern. That is, in a case where the irradiation position of processing light 7 and the irradiation position of measurement light 6 match with each other on processing surface 13 of workpiece 12, it can be seen that an adjustment amount of the irradiation position of measurement light 6 varies depending on the irradiation position of processing light 7.

Hereinafter, a case where the respective irradiation positions of processing light 7 and measurement light 6 are adjusted by using red processing guide light 20 and measurement guide light 19 having the same wavelength will be described with reference to FIG. 3.

Figure 3:
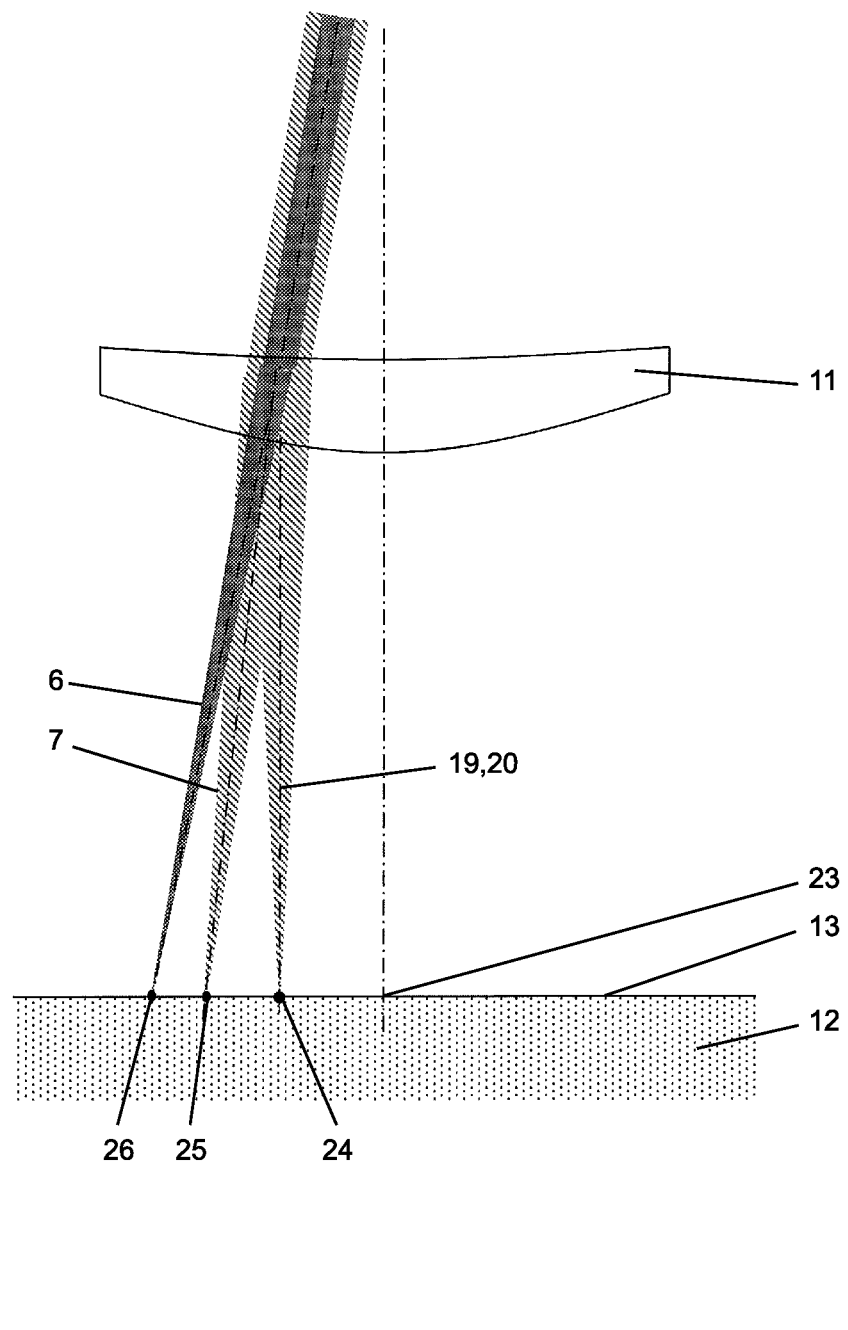
FIG. 3 is a view schematically illustrating an example of a case where respective irradiation positions of the processing light and the measurement light are adjusted by using processing guide light and measurement guide light.

FIG. 3 is a view schematically illustrating an example of a case where the respective irradiation positions of processing light 7 and measurement light 6 are adjusted by using red processing guide light 20 and measurement guide light 19 having the same wavelength.

In FIG. 3, it is assumed that the respective optical axes of processing light 7 and processing guide light 20 incident on lens 11 match with each other. Similarly, it is assumed that the respective optical axes of measurement light 6 and measurement guide light 19 incident on lens 11 match with each other.

As illustrated in FIG. 3, in a case where irradiation position 24 of each of processing guide light 20 and measurement guide light 19 is made be matched and the optical adjustment is performed, the respective optical axes of processing light 7 and measurement light 6 incident on lens 11 match with each other. The respective irradiation positions of processing guide light 20 and measurement guide light 19 are detected by a laser position detection sensor (for example, a two-dimensional light receiving element) (not illustrated) provided outside laser processing apparatus 1.

It is assumed that the respective optical axes of processing light 7 and measurement light 6 incident on lens 11 are inclined with respect to the central axis (lens center 23 illustrated in FIG. 3) of lens 11 due to an adjustment error of optical adjustment, a change in the fixed state of the optical component configuring processing head 2, or the like. In this case, as illustrated in FIG. 3, a deviation occurs between irradiation position 25 of processing light 7 and irradiation position 26 of measurement light 6 due to the influence of the chromatic aberration of magnification.

Specifically, for example, it is assumed that processing light 7 has a wavelength of 1070 nm and measurement light 6 has a wavelength of 1310 nm. It is assumed that lens 11 is a commercially available lens and its focal length is 255 mm. The incident angle of each of processing light 7 and measurement light 6 on lens 11 is 0.5 deg. In this case, due to the chromatic aberration of magnification of lens 11, a deviation of substantially 0.025 mm occurs between irradiation position 25 of processing light 7 and irradiation position 26 of measurement light 6.

In reality, there are errors in respective optical axes of processing light 7 and processing guide light 20, and respective optical axes of measurement light 6 and measurement guide light 19 incident on lens 11. That is, the deviation between irradiation position 25 of processing light 7 and irradiation position 26 of measurement light 6 is larger than the value described above.

Therefore, the deviation between irradiation position 25 of processing light 7 and irradiation position 26 of measurement light 6 is a factor that greatly deteriorates the measurement accuracy of keyhole 16. Therefore, sufficient adjustment accuracy cannot be obtained in the optical adjustment configuration by the guide light of the related art described above.

Therefore, in the present exemplary embodiment, optical adjustment with sufficient adjustment accuracy is possible by selecting the wavelength of the guide light described below.

<Selection Method of Wavelength of Guide Light>

Next, a selection method of the wavelength of the guide light according to the present exemplary embodiment will be described.

Specifically, in the present exemplary embodiment, as the wavelengths of processing guide light 20 and measurement guide light 19, the following wavelengths having mutual deviation amounts equal to each other are selected. The mutual deviation amounts are the deviation amount generated between the irradiation position of processing light 7 and the irradiation position of measurement light 6 due to the chromatic aberration of magnification of lens 11, and the deviation amount generated between the irradiation position of processing guide light 20 and the irradiation position of measurement guide light 19 due to the chromatic aberration of magnification of lens 11.

Hereinafter, a flow of the selection method of the wavelength of the guide light according to the present exemplary embodiment will be described with reference to FIG. 4.

Figure 4:
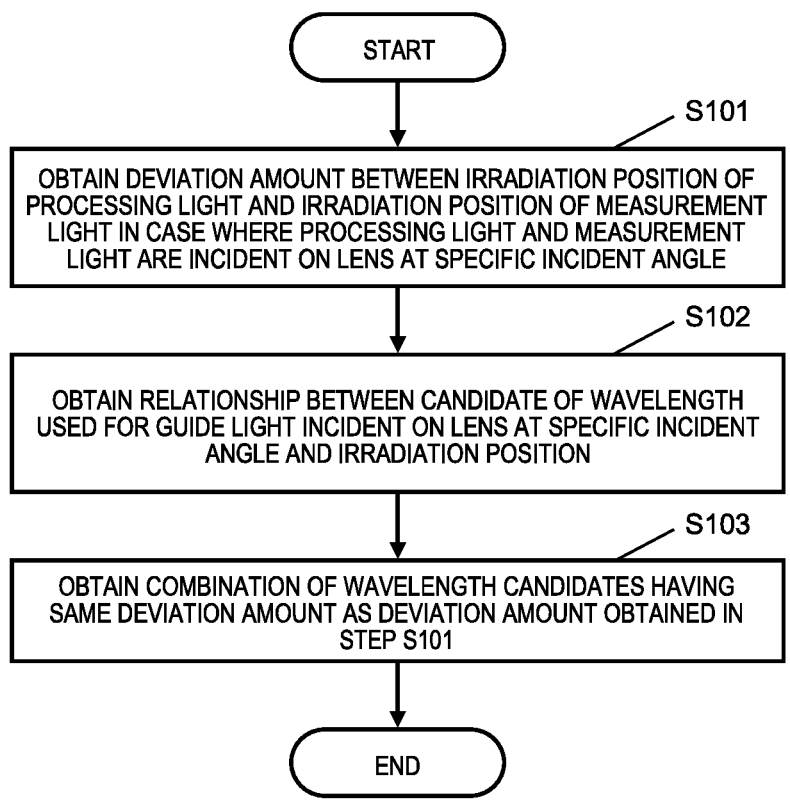
FIG. 4 is a flowchart illustrating a flow of a method of selecting a wavelength of the guide light according to the exemplary embodiment of the present disclosure.

FIG. 4 is a flowchart illustrating the flow of the selection method of the wavelength of the guide light according to the present exemplary embodiment. Each step of the flowchart of FIG. 4 is performed, for example, by a designer of laser processing apparatus 1, an operator who performs the optical adjustment, or the like.

First, as illustrated in FIG. 4, the deviation amount between irradiation position 25 of processing light 7 and irradiation position 26 of measurement light 6 is obtained in a case where processing light 7 and measurement light 6 are respectively incident on lens 11 at a specific incident angle (step S101).

In the present exemplary embodiment, as an example, as described above, a commercially available lens having a focal length of 255 mm was used as lens 11 in advance and the incident angle of processing light 7 and measurement light 6 with respect to lens 11 was 0.5 deg. In this case, the deviation amount (for example, corresponding to deviation amount 27 illustrated in FIG. 6) was obtained by an optical simulation. As a result, the deviation amount was 0.025 mm.

Next, a correspondence relationship between the candidate (hereinafter referred to as "wavelength candidate") of the wavelength used for the guide light incident on lens 11 at a specific incident angle and the irradiation position is obtained (step S102).

Figure 5:
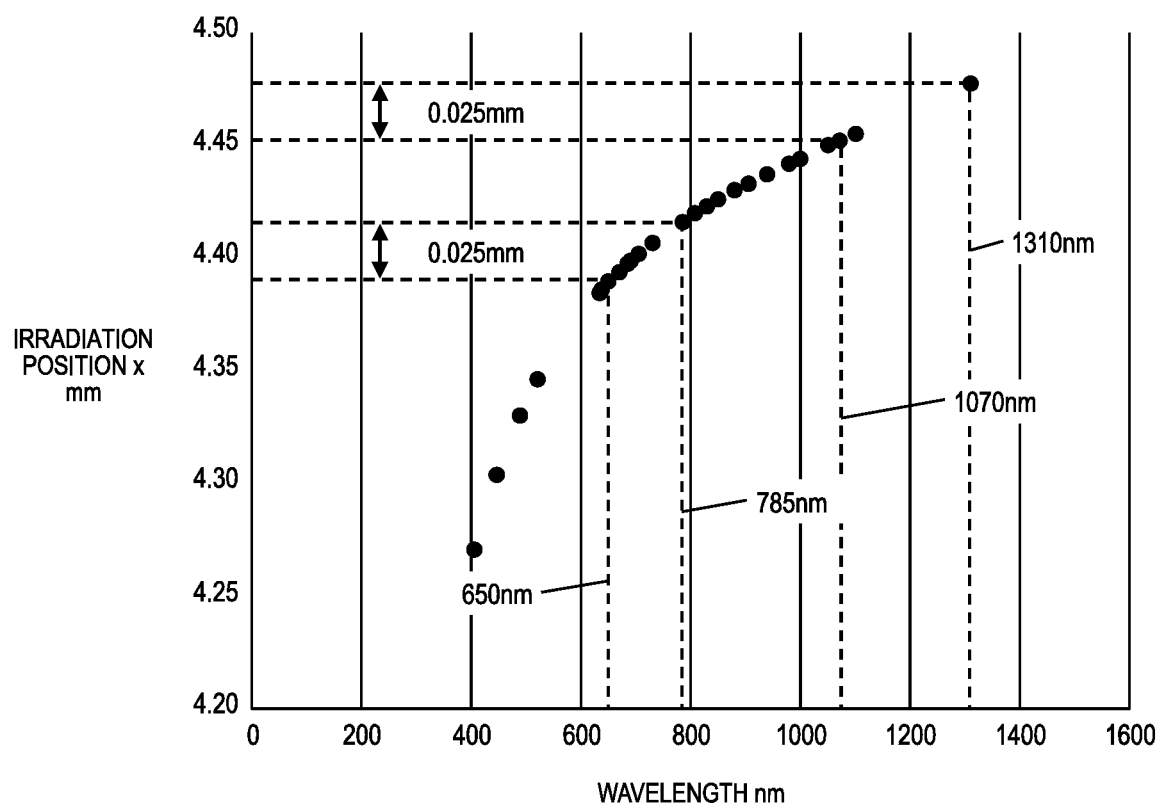
FIG. 5 is a diagram illustrating a calculation example of a correspondence relationship between a candidate of a wavelength used for guide light and an irradiation position according to the exemplary embodiment of the present disclosure.

Specifically, as illustrated in FIG. 5, the correspondence relationship between the wavelength candidate and the irradiation position was obtained. In FIG. 5, a horizontal axis indicates the wavelength (wavelength candidate) and a vertical axis indicates the irradiation position.

The wavelength candidate illustrated in FIG. 5 was selected based on a wavelength of a commercially available laser. In other words, the wavelength candidate was selected from a wavelength band (for example, 300 nm to 1100 nm) that can be measured by a charged coupled devices (CCD) or CMOS. The irradiation position corresponding to each wavelength candidate was obtained by an optical simulation.

FIG. 5 also illustrates the respective irradiation positions of different wavelengths, for example, the wavelength (1070 nm) of processing light 7 and the wavelength (1310 nm) of measurement light 6.

Next, a combination of wavelength candidates having a same deviation amount as the deviation amount obtained in step S101 is obtained (step S103).

From the flow described above, in the present exemplary embodiment, from FIG. 5, for example, 650 nm and 785 nm at which the deviation amount of the irradiation position is 0.025 mm were selected as an example of a combination of wavelength candidates.

In the present exemplary embodiment, a target accuracy of the optical adjustment of each of processing light 7 and measurement light 6 was set to ±0.010 mm. Therefore, in step S103, the deviation amount within 0.010 mm with respect to the deviation amount obtained in step S101 is regarded as the same deviation amount as the deviation amount obtained in step S101, and the combination of wavelength candidates was selected.

The wavelength selected as described above was used as the wavelength of processing guide light 20 and measurement guide light 19. Specifically, for example, the selected 650 nm was used as the wavelength of processing guide light 20, and the selected 785 nm was used as the wavelength of measurement guide light 19. 1070 nm illustrated in FIG. 5 was used as the wavelength of processing light 7, and 1310 nm was used as the wavelength of measurement light 6.

<Relationship Between Irradiation Positions of Processing Light, Measurement Light, and Guide Light>

Next, in a case where processing guide light 20 and measurement guide light 19 having the wavelengths selected by the selection method of the wavelength of the guide light described above are used, a relationship between the respective irradiation positions of processing light 7, measurement light 6, processing guide light 20, and measurement guide light 19 will be described with reference to FIG. 6.

Figure 6:
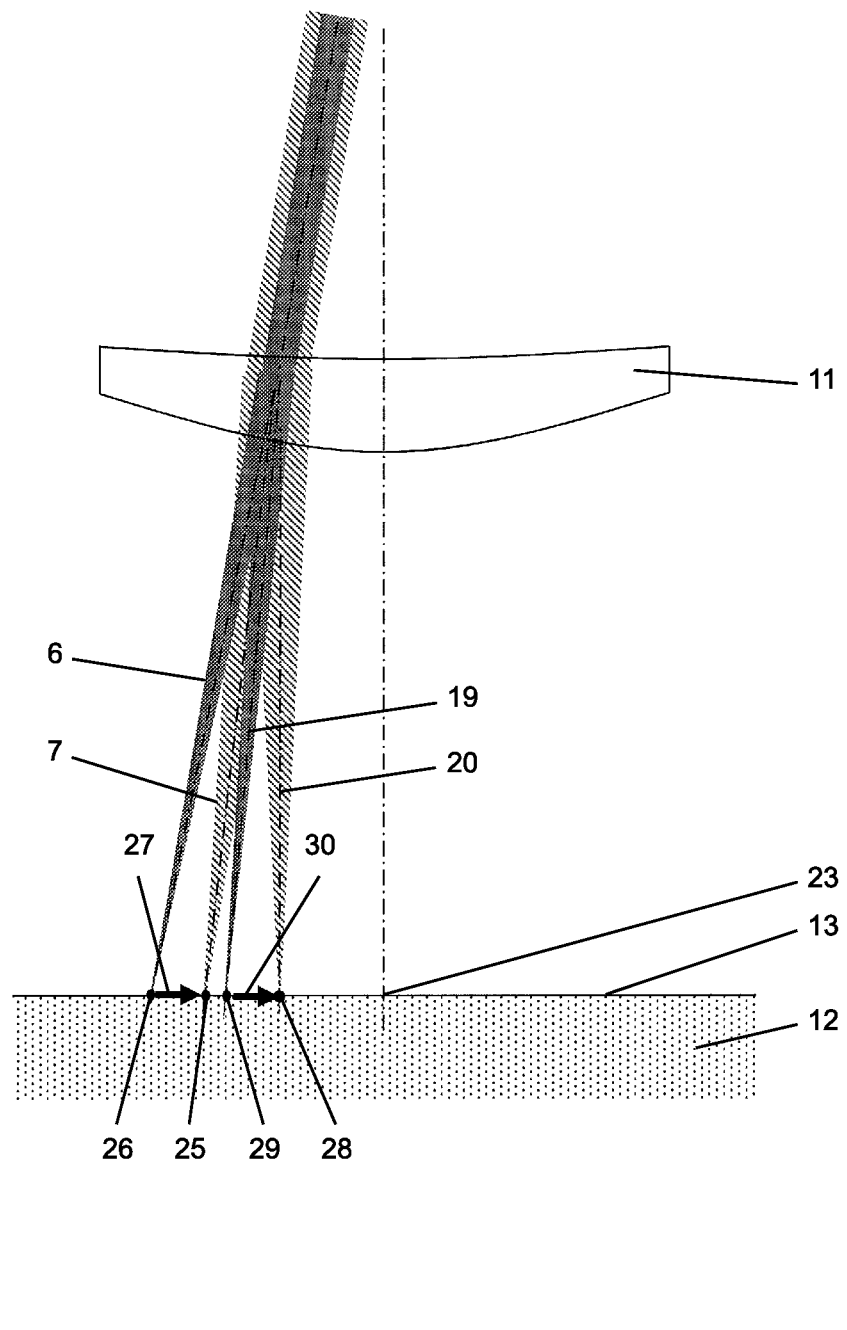
FIG. 6 is a view schematically illustrating a relationship between respective irradiation positions of the processing light, the measurement light, the processing guide light, and the measurement guide light according to the exemplary embodiment of the present disclosure.

FIG. 6 is a view schematically illustrating the relationship between the respective irradiation positions of processing light 7, measurement light 6, processing guide light 20, and measurement guide light 19 according to the present exemplary embodiment.

As illustrated in FIG. 6, in a case where the respective optical axes of processing light 7, measurement light 6, processing guide light 20, and measurement guide light 19 incident on lens 11 match with each other, irradiation position 25 of processing light 7 and irradiation position 26 of measurement light 6 are deviated by deviation amount 27 due to the chromatic aberration of magnification of lens 11.

On the other hand, in a case where the respective optical axes of processing light 7, measurement light 6, processing guide light 20, and measurement guide light 19 incident on lens 11 match with each other, irradiation position 28 of processing guide light 20 and irradiation position 29 of measurement guide light 19 are deviated by deviation amount 30 due to the chromatic aberration of magnification of lens 11.

In this case, deviation amount 27 and deviation amount 30 respectively have the same direction and size.

In a case where the angle of the optical axis of each light incident on lens 11 changes, the direction and size of deviation amount 27 change. However, even if the angle of the optical axis of each light changes, the direction and size of deviation amount 30 change while maintaining the same relationship with the direction and size of deviation amount 27.

Hereinafter, a first example of adjusting the irradiation position by using processing guide light 20 and measurement guide light 19 having the relationship described above will be described with reference to FIG. 7.

Figure 7:
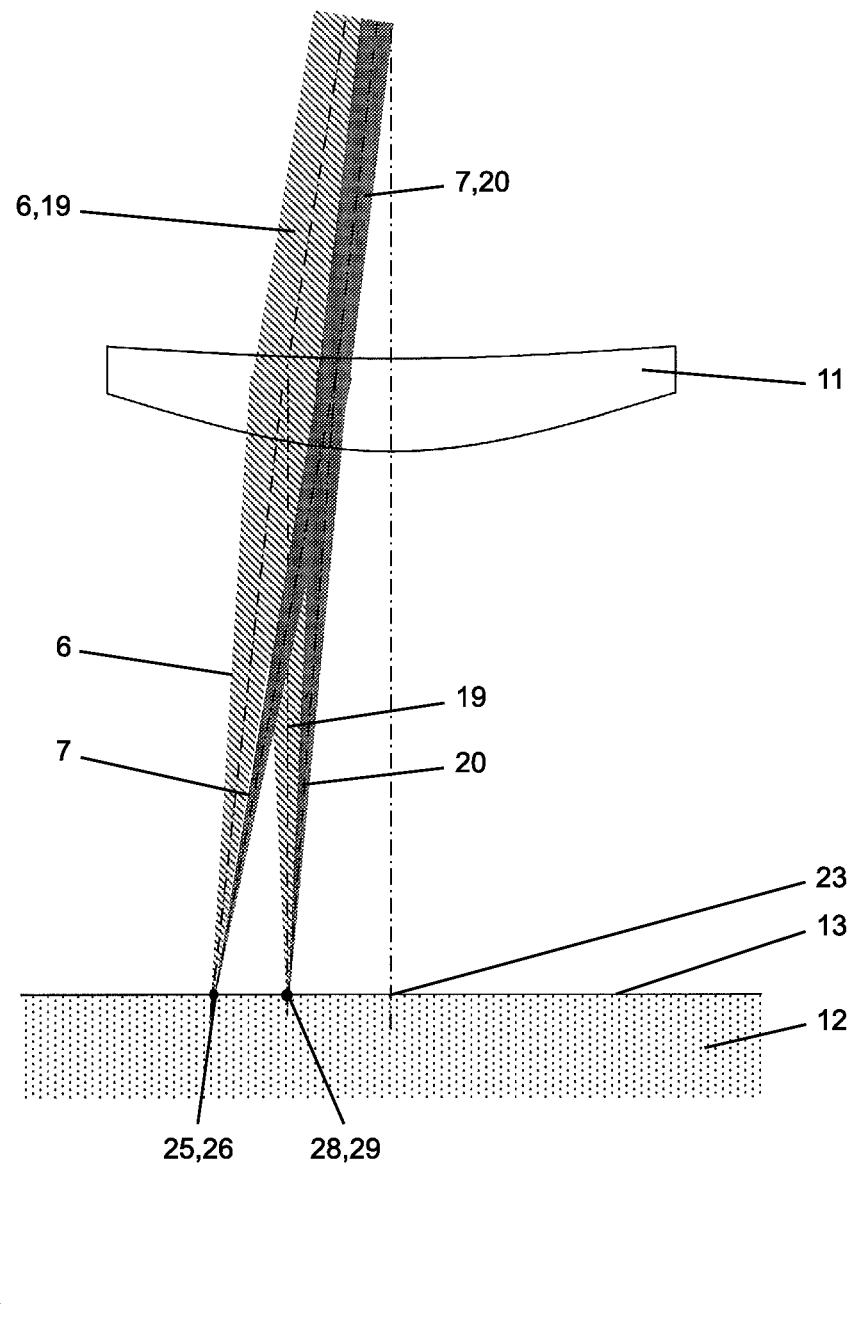
FIG. 7 is a view schematically illustrating a first example in which the irradiation position is adjusted by using the processing guide light and the measurement guide light according to the exemplary embodiment of the present disclosure.

FIG. 7 is a view schematically illustrating a first example in which the irradiation position is adjusted by using processing guide light 20 and measurement guide light 19 according to the present exemplary embodiment.

In FIG. 7, it is assumed that the respective optical axes of processing light 7 and processing guide light 20 incident on lens 11 match with each other. It is assumed that the respective optical axes of measurement light 6 and measurement guide light 19 incident on lens 11 match with each other.

The angle of second mirror 18 illustrated in FIG. 1 is adjusted so that irradiation position 28 of processing guide light 20 illustrated in FIG. 6 and irradiation position 29 of measurement guide light 19 illustrated in FIG. 6 match with each other. Thereby, the respective incident angles of measurement guide light 19 and measurement light 6 on the lens 11 are changed at the same time.

In this case, as described above, the respective directions and sizes of deviation amount 27 and deviation amount 30 illustrated in FIG. 6 are maintained in the same relationship. That is, irradiation position 26 of measurement light 6 changes so that irradiation position 25 of processing light 7 illustrated in FIG. 6 and irradiation position 26 of measurement light 6 illustrated in FIG. 6 match with each other.

As described above, as illustrated in FIG. 7, irradiation position 28 of processing guide light 20 and irradiation position 29 of measurement guide light 19 match with each other. At the same time, irradiation position 25 of processing light 7 and irradiation position 26 of measurement light 6 match with each other.

That is, in laser processing apparatus 1 according to the present exemplary embodiment, processing guide light 20 and measurement guide light 19 are used, which have the wavelengths selected by the selection method of the wavelength of the guide light. Accordingly, irradiation position 25 of processing light 7 and irradiation position 26 of measurement light 6 can be matched without being affected by the chromatic aberration of magnification of lens 11.

<Optical Adjustment Method By Guide Light>

Next, an optical adjustment method using the guide light will be described with reference to FIG. 8.

Figure 8:
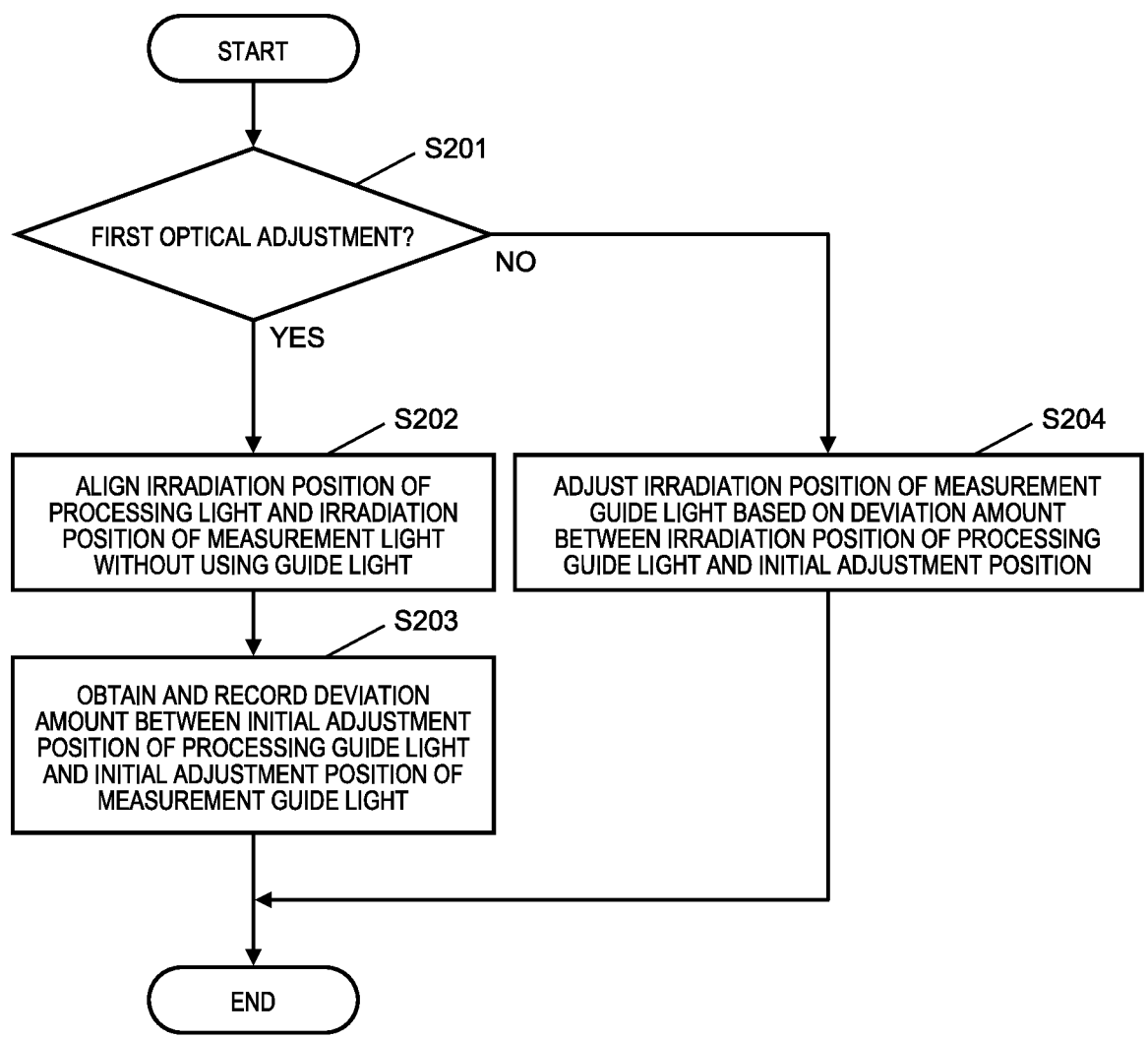
FIG. 8 is a flowchart illustrating a flow of an optical adjustment method using the guide light according to the exemplary embodiment of the present disclosure.

FIG. 8 is a flowchart illustrating a flow of the optical adjustment method by using the guide light according to the present exemplary embodiment. Each step of the flowchart in FIG. 8 may be performed by an operator who performs optical adjustment or the like. Some or all of the steps in the flowchart of FIG. 8 may be performed by laser processing apparatus 1 for the purpose of automation.

After the selection method of the wavelength of the guide light described above is performed once, the optical adjustment method by using the guide light described below is repeatedly executed.

That is, as illustrated in FIG. 8, first, it is determined whether or not a current optical adjustment is a first optical adjustment (step S201).

At this time, in a case where the current optical adjustment is the first optical adjustment (YES in step S201), irradiation position 25 of processing light 7 and irradiation position 26 of measurement light 6 are aligned without using the guide light (step S202).

The reason why step S202 is performed will be described.

In the first example in which the irradiation position is adjusted by using processing guide light 20 and measurement guide light 19 described in FIG. 7, it is assumed a case where the optical axes of processing light 7 and processing guide light 20 incident on lens 11 match with each other, and the optical axes of measurement light 6 and measurement guide light 19 incident on lens 11 match with each other. However, in reality, the respective optical axes may be deviated.

In this case, even if irradiation position 28 of processing guide light 20 and irradiation position 29 of measurement guide light 19 match with each other, the irradiation positions of processing light 7 and measurement light 6 are deviated.

Therefore, in the case of the first optical adjustment (YES in step S201), the irradiation positions of processing light 7 and measurement light 6 are adjusted without using the guide light.

Hereinafter, an optical adjustment method of the irradiation positions of processing light 7 and measurement light 6 will be described using a specific example.

First, processing surface 13 of workpiece 12 prepared for the optical adjustment is irradiated with processing light 7 to make a minute hole on processing surface 13. After that, while adjusting the angle of second mirror 18, a periphery of the minute hole is scanned by measurement light 6 to obtain a center portion (or a deepest portion) of the minute hole. The irradiation position of measurement light 6 is adjusted by using the obtained center portion of the minute hole as a center position of processing light 7.

The method described above is an example of adjusting the respective irradiation positions of processing light 7 and measurement light 6, and is not limited to this. For example, a method (for example, see Patent Document 1) of adjusting the irradiation position by using a slit and a power meter, or the like may be used for adjusting the irradiation position.

The reason why step S202 is performed is described above. Hereinafter, it returns to the description of the flow of FIG. 8.

Next, the deviation amount between the initial adjustment position of processing guide light 20 and the initial adjustment position of measurement guide light 19 is obtained and recorded in a memory (not illustrated) or the like (step S203). The initial adjustment position is a position when the positioning (that is, the first optical adjustment) of the irradiation position in step S202 is performed.

A specific example of step S203 will be described with reference to FIG. 9.

Figure 9:
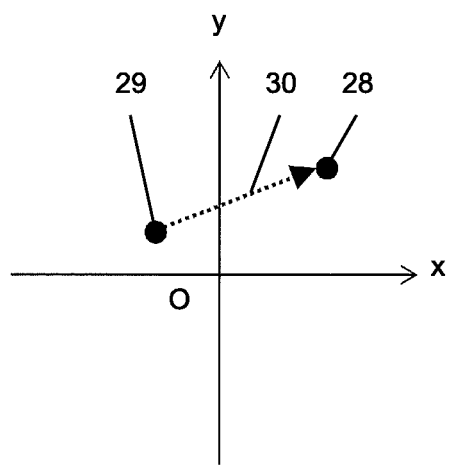
FIG. 9 is a diagram schematically illustrating respective initial adjustment positions of the processing guide light and the measurement guide light according to the exemplary embodiment of the present disclosure.

FIG. 9 is a diagram schematically illustrating the respective initial adjustment positions of processing guide light 20 and measurement guide light 19 according to the present exemplary embodiment.

In step S202 of FIG. 8, even if the irradiation position of processing light 7 and the irradiation position of measurement light 6 match with each other, in the state described below, as illustrated in FIG. 9, deviation amount 30 is generated between irradiation position 28 of processing guide light 20 and irradiation position 29 of measurement guide light 19. This corresponds to a case where the respective optical axes of processing light 7 and processing guide light 20 incident on lens 11 are deviated, and the respective optical axes of measurement light 6 and measurement guide light 19 incident on lens 11 are deviated.

Specifically, in step S203, deviation amount 30 illustrated in FIG. 9 is obtained. Obtained deviation amount 30 is recorded in the memory (not illustrated) of laser processing apparatus 1 as the deviation amount of the initial adjustment position. The recorded deviation amount of the initial adjustment position is used in step S204, in which is the second and subsequent optical adjustments (NO in step S201) are performed.

The specific example of step S203 is described above. Hereinafter, it returns to the description of the flow of FIG. 8.

As illustrated in FIG. 8, when step S203 ends, the first optical adjustment is completed.

In step S201, in a case where it is determined that the current optical adjustment is the second and subsequent times (NO in step S201), the irradiation position of measurement guide light 19 is adjusted (step S204) based on the deviation amount between the irradiation position of processing guide light 20 and the initial adjustment position.

A specific example of step S204 will be described with reference to FIG. 10.

Figure 10:
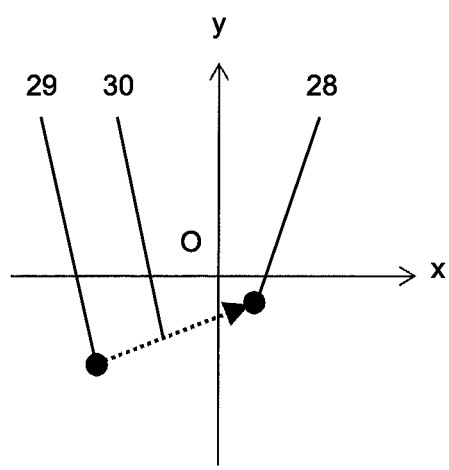
FIG. 10 is a diagram schematically illustrating irradiation positions of the processing guide light and the measurement guide light after optical adjustment according to the exemplary embodiment of the present disclosure.

FIG. 10 is a diagram schematically illustrating the irradiation positions of the processing guide light and the measurement guide light after the optical adjustment according to the present exemplary embodiment.

That is, in the second and subsequent optical adjustments, the fixing state of the optical component configuring processing head 2 may change due to the influence of heat caused by the use of laser processing apparatus 1. When the fixed state of the optical component changes, the respective incident angles of processing light 7 and processing guide light 20 with respect to lens 11 simultaneously change. Therefore, the irradiation position of processing light 7 and the irradiation position of processing guide light 20 both move. For example, irradiation position 28 of processing guide light 20 illustrated in FIG. 9 moves to another irradiation position 28 as illustrated in FIG. 10. As a result, a deviation occurs between the irradiation position of processing light 7 and the irradiation position of measurement light 6.

Therefore, in step S204, the deviation amount between irradiation position 28 of processing guide light 20 and irradiation position 29 of measurement guide light 19 is adjusted by using second mirror 18 illustrated in FIG. 1. Specifically, the deviation amount is adjusted by using second mirror 18 so that the deviation amount between irradiation position 28 of processing guide light 20 illustrated in FIG. 10 and irradiation position 29 of measurement guide light 19 illustrated in FIG. 10 is equal to the deviation amount (for example, deviation amount 30 illustrated in FIG. 9) of the initial adjustment position obtained in step S203.

In this case, the respective coordinates of irradiation positions 28 and 29 illustrated in FIG. 10 are different from the respective coordinates of irradiation positions 28 and 29 illustrated in FIG. 9, but deviation amount 30 is the same.

That is, the relative positional relationships between irradiation positions 28 and 29 illustrated in FIGS. 9 and 10 match with each other.

Hereinafter, a second example of adjusting the irradiation position by using processing guide light 20 and measurement guide light 19 having the relationship described above will be described with reference to FIG. 11.

Figure 11:
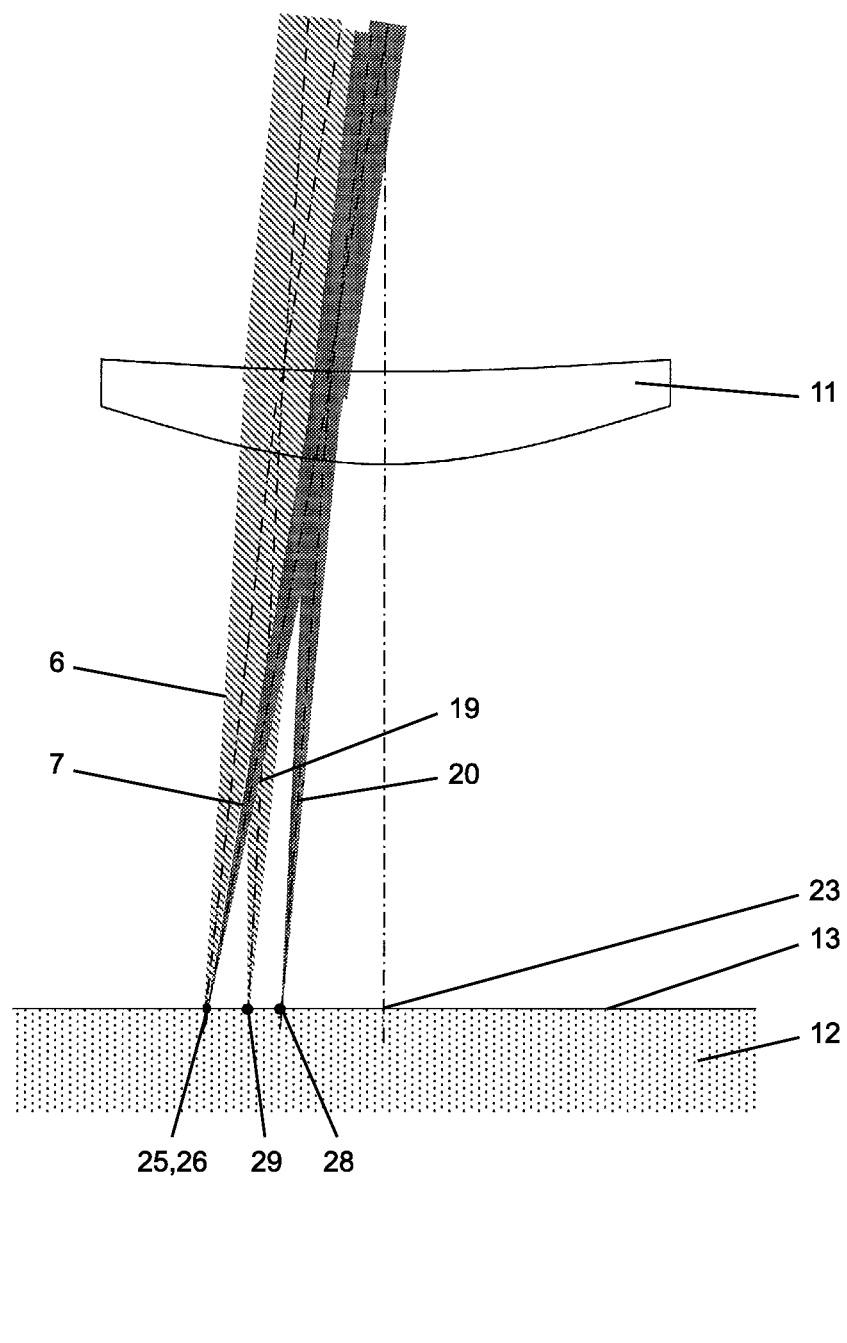
FIG. 11 is a view schematically illustrating a second example in which an irradiation position is adjusted by using the processing guide light and the measurement guide light according to the exemplary embodiment of the present disclosure.
Figure 13:
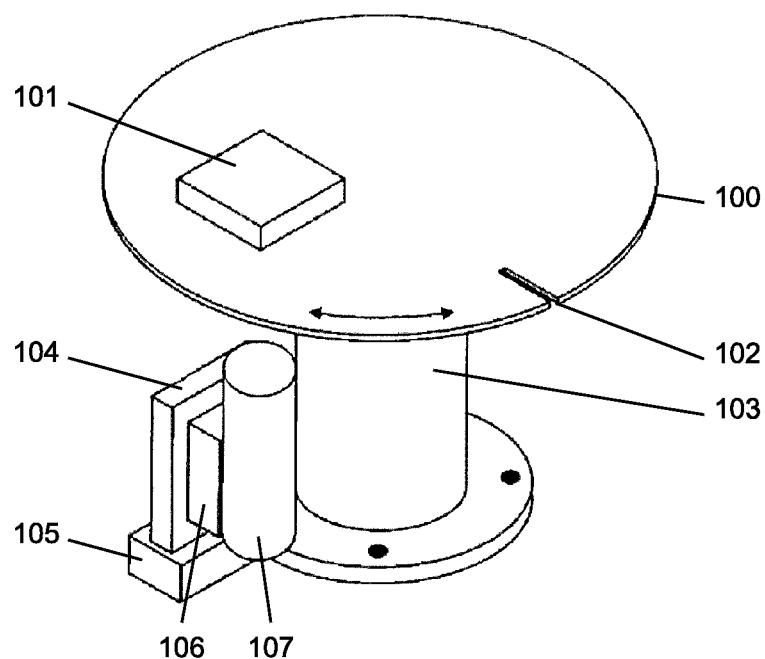
FIG. 13 is a perspective view of a laser light positioning device disclosed in Patent Document 1.
Figure 14:
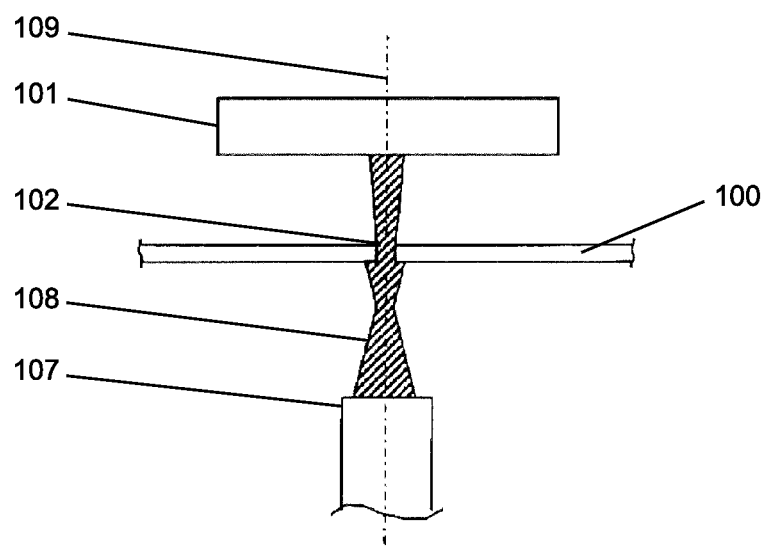
FIG. 14 is a side sectional view of the laser light positioning device disclosed in Patent Document 1.

FIG. 11 is a view schematically illustrating the second example in which the irradiation position is adjusted by using processing guide light 20 and measurement guide light 19 according to the present exemplary embodiment.

As described above, in the present exemplary embodiment, as the respective wavelengths of processing guide light 20 and measurement guide light 19, wavelengths at which the deviation amounts of the irradiation positions described below are equal to each other are used. Specifically, the wavelengths are used such that the deviation amount between the irradiation position of processing light 7 and the irradiation position of measurement light 6 due to the chromatic aberration of magnification of lens 11, and the deviation amount between the irradiation position of processing guide light 20 and the irradiation position of measurement guide light 19 due to the chromatic aberration of magnification of lens 11 are equal to each other.

Therefore, in a case where deviation amount 30 illustrated in FIG. 10 is equal to deviation amount 30 illustrated in FIG. 9, in FIG. 11, the deviation amount between the irradiation position of processing light 7 and the irradiation position of measurement light 6 matches with deviation amount 30 illustrated in FIG. 9. That is, as illustrated in FIG. 11, irradiation position 25 of processing light 7 and irradiation position 26 of measurement light 6 match with each other.

As described above, in step S204 illustrated in FIG. 8, it is possible to match the respective irradiation positions of processing light 7 and measurement light 6 only by using the guide light of processing guide light 20 and measurement guide light 19.

The specific example of step S204 is described above.

As illustrated in FIG. 8, when step S204 ends, the optical adjustment is completed.

As described above, in the second and subsequent optical adjustments, the optical adjustment can be performed only by using the guide light of processing guide light 20 and measurement guide light 19.

Effects

Next, operations and effects of the present exemplary embodiment will be described with reference to FIG. 12.

FIG. 12 is a table illustrating an optical simulation result of optical adjustment of the processing light and the measurement light by the guide light according to the present exemplary embodiment.

In the optical simulation of the present exemplary embodiment, the wavelength of processing light 7 was set to 1070 nm, and the wavelength of measurement light 6 was set to 1310 nm. An optical simulation was performed by setting the wavelength of processing guide light 20 to 650 nm and the wavelength of measurement guide light 19 to 785 nm.

The wavelength of processing guide light 20 and the wavelength of measurement guide light 19 are wavelengths such that the deviation amount between the irradiation position of processing light 7 and the irradiation position of measurement light 6 due to the chromatic aberration of magnification of lens 11 is equal to the deviation amount between the irradiation position of processing guide light 20 and the irradiation position of measurement guide light 19 due to the chromatic aberration of magnification of lens 11.

In the optical simulation of the present exemplary embodiment, the angle deviation of the optical axis of processing guide light 20 with respect to processing light 7 incident on lens 11 was set to 0.1 deg. The angle deviation of the optical axis of measurement guide light 19 with respect to measurement light 6 incident on lens 11 was set to −0.05 deg.

In the present exemplary embodiment, an optical simulation was performed on the X-axis passing through lens center 23 (see FIGS. 2, 3, 6, and 7).

The incident angle of processing light 7 on lens 11 was set to 0.5 deg at the time of initial adjustment in step S202 of FIG. 8. On the other hand, at the time of the optical adjustment using the guide light in step S204 of FIG. 8, the optical simulation was performed by setting to 1.0 deg, 1.5 deg, and 2.0 deg.

Based on the respective conditions described above, the deviation amount between the irradiation position of processing guide light 20 and the irradiation position of measurement guide light 19 is adjusted within an error range of 0.004 mm according to the deviation amount of the initial adjustment position. The deviation amount of the initial adjustment position is the deviation amount x=−1.310 mm of the irradiation position of the guide light when the incident angle of the processing light on the lens is 0.5 deg.

As a result of the adjustment described above, as illustrated in FIG. 12, the deviation amount between the irradiation positions of processing light 7 and measurement light 6 could be adjusted within a range of 0 mm to 0.005 mm.

That is, according to the optical simulation of the present exemplary embodiment, it could be confirmed that the respective irradiation positions of processing light 7 and measurement light 6 can be adjusted with high accuracy only by using the guide light without being affected by the chromatic aberration of magnification of lens 11.

Laser processing apparatus 1 of the present exemplary embodiment can use a low-power laser as the guide light. Therefore, the respective irradiation positions of processing light 7 and measurement light 6 can be adjusted, for example, only by a general-purpose laser position detection sensor such as a beam profiler or an area camera. Thereby, the optical adjustment can be performed at high speed.

In laser processing apparatus 1 of the present exemplary embodiment, the wavelength of the guide light is selected from a wavelength band (for example, 300 nm to 1100 nm) that can be measured by using charged coupled devices (CCD) or CMOS. Therefore, the optical adjustment can be performed with an inexpensive configuration.

As described above, according to laser processing apparatus 1 of the present exemplary embodiment, the positioning of the spot positions (irradiation positions) of a plurality of laser lights having different output differences can be realized with high accuracy, high speed, and low cost.

In the present exemplary embodiment, a case where irradiation position 26 of measurement light 6 is adjusted by using second mirror 18 which is an adjustment mechanism in the optical adjustment of processing light 7 and measurement light 6 is described as an example, but it is not limited to the exemplary embodiment. For example, an adjustment mechanism may be provided in the optical path of processing light 7, and irradiation position 25 of processing light 7 may be adjusted via the adjustment mechanism. The adjustment mechanism used in the present exemplary embodiment may be a manual type or an electrically controlled type.

In the present exemplary embodiment, a case where the laser position detection sensor provided outside laser processing apparatus 1 is used in the optical adjustment of processing light 7 and measurement light 6 by using the guide light is described as an example, but it is not limited to the exemplary embodiment. For example, the laser position detection sensor may be mounted on laser processing apparatus 1.

In this case, first, laser processing apparatus 1 moves the laser position detection sensor to a predetermined optical adjustment position.

Next, laser processing apparatus 1 controls the adjustment mechanism that adjusts the irradiation position of processing light 7 and the adjustment mechanism (for example, second mirror 18) that adjusts the irradiation position of the measurement light 6 based on the respective irradiation positions of processing guide light 20 and measurement guide light 19 detected by the laser position detection sensor.

With this configuration, for example, in a case where it is necessary to periodically perform the optical adjustment in a continuously operating production line or the like, the optical adjustment can be automatically performed only by laser processing apparatus 1. Therefore, the time required for the optical adjustment can be greatly reduced.

The present disclosure is not limited to the description of the exemplary embodiments described above, and various modifications can be made without departing from the spirit of the present disclosure.

What is claimed is:

1. A laser processing apparatus comprising:
   a laser oscillator that emits a processing light with which a processing point of a surface of a workpiece is irradiated;
   a measurement unit that emits a measurement light with which the processing point is irradiated, and detects the measurement light reflected from a bottom surface of a keyhole formed at the processing point, wherein a wavelength of the measurement light is different from a wavelength of the processing light;
   a first mirror that combines the processing light and the measurement light;
   a second mirror configured to change an angle of measurement light, wherein the second mirror is adjusted such that an irradiation position of the processing light and an irradiation position of the measurement light on the surface of the workpiece match with each other;
   a lens that condenses the processing light and the measurement light on the processing point; and
   a measurement processor that performs a predetermined measurement based on a signal from the measurement unit,
      wherein for adjusting a deviation between an irradiation position of the processing light and an irradiation position of the measurement light on the surface of the workpiece, the laser oscillator emits a processing guide light with which the surface of the workpiece is irradiated and the measurement unit emits a measurement guide light with which the surface of the workpiece is irradiated, the processing guide light having a different wavelength from the processing light and the measurement guide light having a different wavelength from the measurement light,
      wherein respective wavelengths of the processing guide light and the measurement guide light are set to wavelengths at which a deviation amount between an irradiation position of the processing guide light and an irradiation position of the measurement guide light due to a chromatic aberration of magnification of the lens, and a deviation amount between the irradiation position of the processing light and the irradiation position of the measurement light due to the chromatic aberration of magnification of the lens are equal to each other, wherein the irradiation position of the processing guide light and the irradiation position of the measurement guide light match with each other by adjusting the angle of the measurement guide light using the second mirror and thereby the irradiation position of the processing light and the irradiation position of the measurement light match each other, and wherein the respective wavelengths of the processing guide light and the measurement guide light are set by obtaining the deviation amount between the irradiation position of the processing light and the irradiation position of the measurement light when the processing light and the measurement light are respectively incident on the lens at a desired incident angle, obtaining a correspondence relationship between a candidate wavelength used for each of the processing guide light and the measurement guide light, and an irradiation position when a light having the respective one of the candidate wavelengths is incident on the lens at the desired incident angle, and obtaining a combination of the candidate wavelengths having a deviation within a target accuracy with respect to the deviation amount between the irradiation position of the processing light and the irradiation position of the measurement light.

2. The laser processing apparatus of claim 1, wherein the first mirror is a dichroic mirror.

3. The laser processing apparatus of claim 1, wherein the measurement unit is an optical interferometer that generates an optical interference intensity signal based on interference generated by an optical path difference between the measurement light reflected at the processing point and reference light.

4. The laser processing apparatus of claim 3, wherein the measurement processor calculates a depth of a keyhole generated at the processing point based on the optical interference intensity signal.

5. The laser processing apparatus of claim 1, further comprising:
a two-dimensional light receiving element that detects the irradiation positions of the processing guide light and the irradiation position of the measurement guide light.

6. The laser processing apparatus of claim 1,
wherein when a first deviation amount is the deviation amount between an irradiation position of the processing guide light and an irradiation position of the measurement guide light due to the chromatic aberration of magnification of the lens, and when a second deviation amount is the deviation amount between the irradiation position of the processing light and the irradiation position of the measurement light due to the chromatic aberration of magnification of the lens, and
the respective wavelengths of the processing guide light and the measurement guide light are set to wavelengths, by an optical simulation, such that the first deviation and the second deviation amount are in a range of ±0.010 mm to each other and that the wavelengths are in a range of 300 nm to 1100 nm.

7. A laser processing apparatus includes,
a laser oscillator that emits a processing light with which a processing point of a surface of a workpiece is irradiated,
a measurement unit that emits a measurement light with which the processing point is irradiated, and detects the measurement light reflected from a bottom surface of a keyhole formed at the processing point,
a first mirror that combines the processing light and the measurement light,
a second mirror configured to change an angle of measurement light, wherein the second mirror is adjusted such that an irradiation position of the processing light and an irradiation position of the measurement light on the surface of the workpiece match with each other,
a lens that condenses the processing light and the measurement light on the processing point and
a measurement processor that performs a predetermined measurement based on an optical interference intensity signal from the measurement unit,
wherein for adjusting a deviation between an irradiation position of the processing light and an irradiation position of the measurement light on the surface of the workpiece, the laser oscillator emits a processing guide light with which the surface of the workpiece is irradiated and the measurement unit emits a measurement guide light which the surface of the workpiece is irradiated, the processing guide light having a different wavelength from the processing light and the measurement guide light having a different wavelength from the measurement light, and
wherein respective wavelengths of the processing guide light and the measurement guide light are set to wavelengths at which a deviation amount between an irradiation position of the processing guide light and an irradiation position of the measurement guide light due to a chromatic aberration of magnification of the lens, and a deviation amount between the irradiation position of the processing light and the irradiation position of the measurement light due to the chromatic aberration of magnification of the lens are equal to each other, wherein
a wavelength of the processing light and a wavelength of the measurement light are different from each other,
the first mirror is a dichroic mirror,
the measurement unit is an optical interferometer that generates the optical interference intensity signal based on interference generated by an optical path difference between the measurement light reflected at the processing point and reference light,
wherein the irradiation position of the processing guide light and the irradiation position of the measurement guide light match with each other by adjusting the angle of the measurement guide light using the second mirror and thereby the irradiation position of the processing light and the irradiation position of the measurement light match each other,
wherein the respective wavelengths of the processing guide light and the measurement guide light are set by obtaining the deviation amount between the irradiation position of the processing light and the irradiation position of the measurement light when the processing light and the measurement light are respectively incident on the lens at a desired incident angle, obtaining a correspondence relationship between a candidate wavelength used for each of the processing guide light and the measurement guide light, and an irradiation position when a light having the respective one of the candidate wavelengths is incident on the lens at the desired incident angle, and obtaining a combination of the candidate wavelengths having a deviation within a target accuracy with respect to the deviation amount between the irradiation position of the processing light and the irradiation position of the measurement light, in a first optical adjustment,
   the laser processing apparatus is configured to
      align an irradiation position of the processing light with an irradiation position of the measurement light without using the processing guide light and the measurement guide light, and
      record a deviation amount between an irradiation position of the processing guide light and an irradiation position of the measurement guide light, as a deviation amount of an initial adjustment position; and in second and subsequent optical adjustments,
   the laser processing apparatus is configured to
      adjust a deviation amount between the irradiation position of the processing guide light and the irradiation position of the measurement guide light to be equal to the deviation amount of the initial adjustment position.

8. An optical adjustment method performed by a laser processing apparatus that emits a processing light, a measurement light for measuring a depth of a keyhole formed by the processing light, a processing guide light, and a measurement guide light with which a processing point on a surface of a workpiece is irradiated, wherein the laser processing apparatus includes a lens that condenses the processing light, the measurement light, the processing guide light and the measurement guide light on the processing point, and respective wavelengths of the processing guide light and the measurement guide light are set to wavelengths at which a deviation amount between an irradiation position of the processing guide light and an irradiation position of the measurement guide light due to a chromatic aberration of magnification of the lens, and the irradiation position of the processing light and the irradiation position of the measurement light match with each other by matching the irradiation position of the processing guide light and the irradiation position of the measurement guide light with each other, the method comprising:

in a first optical adjustment,
   aligning an irradiation position of the processing light with an irradiation position of the measurement light without using the processing guide light and the measurement guide light, wherein the processing light and the processing guide light are emitted from a first source, and the measurement light and the measurement guide light are emitted from a second source different from the first source, and
   recording a deviation amount between the irradiation position of the processing guide light and the irradiation position of the measurement guide light, as a deviation amount of an initial adjustment position; and in second and subsequent optical adjustments,
adjusting a deviation amount between the irradiation position of the processing guide light and the irradiation position of the measurement guide light so as to be equal to the deviation amount of the initial adjustment position, wherein
   a wavelength of the processing light and a wavelength of the measurement light are different from each other,
   the irradiation position of the processing guide light and the irradiation position of the measurement guide light match with each other by adjusting an angle of the measurement guide light and thereby the irradiation position of the processing light and the irradiation position of the measurement light match each other, and
   respective wavelengths of the processing guide light and the measurement guide light are set by obtaining the deviation amount between the irradiation position of the processing light and the irradiation position of the measurement light when the processing light and the measurement light are respectively incident on the lens at a desired incident angle, obtaining a correspondence relationship between a candidate wavelength used for each of the processing guide light and the measurement guide light, and an irradiation position when a light having the respective one of the candidate wavelengths is incident on the lens at the desired incident angle, and obtaining a combination of the candidate wavelengths having a deviation within a target accuracy with respect to the deviation amount between the irradiation position of the processing light and the irradiation position of the measurement light.

9. The optical adjustment method of claim 8, wherein
in the first optical adjustment,
the surface of the workpiece prepared for the optical adjustment is irradiated with the processing light to make a minute hole on the surface, and then, a periphery of the minute hole is scanned by measurement light to obtain a center portion of the minute hole, and
the irradiation position of the measurement light is adjusted by using the obtained center portion of the minute hole as a center position of the processing light.

* * * * *